(12) United States Patent
Gwag

(10) Patent No.: US 9,125,502 B2
(45) Date of Patent: Sep. 8, 2015

(54) HANGER PANEL AND HANGER DEVICE USING THE SAME

(71) Applicant: ACE-HINGE TECH CO., LTD., Bucheon-si (KR)

(72) Inventor: Su-Man Gwag, Bucheon-si (KR)

(73) Assignee: ACE-HINGE TECH CO., LTD., Bucheon-si, Gyeonggi-do (KR)

( * ) Notice: Subject to any disclaimer, the term of this patent is extended or adjusted under 35 U.S.C. 154(b) by 240 days.

(21) Appl. No.: 13/846,603

(22) Filed: Mar. 18, 2013

(65) Prior Publication Data

US 2014/0048503 A1 Feb. 20, 2014

(30) Foreign Application Priority Data

Aug. 20, 2012 (KR) .................. 10-2012-0090905

(51) Int. Cl.
*A47F 5/08* (2006.01)
(52) U.S. Cl.
CPC ............. *A47F 5/0884* (2013.01); *A47F 5/0846* (2013.01); *A47F 5/0853* (2013.01)
(58) Field of Classification Search
CPC ...... A47B 57/00; A47B 57/58; A47F 5/0884; A47F 5/0853; A47F 5/0846
USPC .................. 211/86.01, 87.01, 4, 106.01, 162; 248/225.11, 298.1, 466, 917
See application file for complete search history.

(56) References Cited

U.S. PATENT DOCUMENTS

| | | | | |
|---|---|---|---|---|
| 574,509 A * | 1/1897 | Welter | ...................... | 211/106.01 |
| 698,272 A * | 4/1902 | Glover | ............................. | 211/39 |
| 716,852 A * | 12/1902 | Baker | ............................ | 248/244 |
| 2,644,591 A * | 7/1953 | McMahan | ................ | 248/220.41 |
| 2,812,918 A * | 11/1957 | Longino | .................... | 248/316.4 |
| 3,174,714 A * | 3/1965 | Brndsby | ..................... | 248/309.4 |
| 3,613,900 A * | 10/1971 | Chiu | ............................. | 108/106 |
| 3,711,053 A * | 1/1973 | Drake | ........................ | 248/298.1 |
| 3,840,265 A * | 10/1974 | Stirling et al. | .................. | 296/19 |
| 3,891,172 A * | 6/1975 | Einhorn | .................... | 248/220.43 |
| 4,186,952 A * | 2/1980 | Glass | ............................ | 292/202 |
| 4,352,478 A * | 10/1982 | Loew | ........................ | 248/222.11 |
| 4,537,379 A * | 8/1985 | Rhoades | ................... | 248/222.51 |
| 5,007,608 A * | 4/1991 | Carroll, Jr. | ................... | 248/297.21 |
| 5,199,836 A * | 4/1993 | Gogarty | ......................... | 411/84 |
| 5,305,898 A * | 4/1994 | Merl | ........................... | 211/87.01 |
| 5,372,344 A * | 12/1994 | Syvuk | ...................... | 248/225.11 |
| 5,383,629 A * | 1/1995 | Morgan | .................... | 244/118.6 |
| 5,740,927 A * | 4/1998 | Yemini | ........................ | 211/70.6 |

(Continued)

FOREIGN PATENT DOCUMENTS

| | | |
|---|---|---|
| JP | 52-132734 | 10/1977 |
| JP | 56-6281 U | 1/1981 |

(Continued)

*Primary Examiner* — Joshua J Michener
*Assistant Examiner* — Devin Barnett
(74) *Attorney, Agent, or Firm* — Novick, Kim & Lee, PLLC; Jae Youn Kim

(57) ABSTRACT

Disclosed is a hanger panel which assists in hanging a variety of articles, such as a tablet PC, a smart phone, a cup holder, a pencil holder, etc., to a table, a desk, a wall, or the like, and a hanger device using the same. The hanger device includes a hanger panel provided with a plurality of hanging grooves, stands spaced apart from each other in parallel by a predetermined distance to support the hanger panel, and a slide fixing member movably fixed to the stand to fix the hanger panel to the stand.

13 Claims, 21 Drawing Sheets

(56) References Cited

U.S. PATENT DOCUMENTS

| | | | |
|---|---|---|---|
| 6,266,250 B1* | 7/2001 | Foye | 361/760 |
| 6,409,029 B1* | 6/2002 | Bermes | 211/70.6 |
| 6,676,176 B1* | 1/2004 | Quandt | 292/202 |
| 7,021,814 B2* | 4/2006 | Berardi | 362/650 |
| 7,048,242 B2* | 5/2006 | Oddsen, Jr. | 248/280.11 |
| 7,086,542 B2* | 8/2006 | Tomonari et al. | 211/94.01 |
| 7,097,204 B2* | 8/2006 | Jessup et al. | 280/748 |
| 7,228,977 B2* | 6/2007 | Perkins et al. | 211/94.01 |
| 7,286,342 B2* | 10/2007 | Yang | 361/679.27 |
| 7,300,029 B2* | 11/2007 | Petrick et al. | 248/285.1 |
| 7,317,613 B2* | 1/2008 | Quijano et al. | 361/679.41 |
| 7,604,131 B1* | 10/2009 | Clark et al. | 211/17 |
| 8,061,539 B2* | 11/2011 | Punzel et al. | 211/103 |
| 8,066,130 B2* | 11/2011 | Shaha et al. | 211/90.01 |
| 8,154,885 B2* | 4/2012 | Anderson | 361/825 |
| RE43,696 E* | 10/2012 | Graham | 248/298.1 |
| 8,322,673 B2* | 12/2012 | Sculler | 248/317 |
| 8,376,156 B2* | 2/2013 | Jarvis et al. | 211/187 |
| 8,550,415 B2* | 10/2013 | Sculler et al. | 248/298.1 |
| 8,636,154 B2* | 1/2014 | Chinn | 211/103 |
| 8,662,322 B2* | 3/2014 | Magnusson et al. | 211/70.6 |
| 8,777,020 B2* | 7/2014 | Winig et al. | 211/85.1 |
| 8,888,062 B2* | 11/2014 | Novin | 248/281.11 |
| 8,910,560 B2* | 12/2014 | Irwin | 89/37.01 |
| 8,925,739 B2* | 1/2015 | Crippen et al. | 211/26 |
| 2004/0079849 A1* | 4/2004 | Rudolf | 248/276.1 |
| 2004/0200791 A1* | 10/2004 | Bostick et al. | 211/94.01 |
| 2005/0006539 A1* | 1/2005 | Fischer et al. | 248/220.42 |
| 2005/0092890 A1* | 5/2005 | Liao | 248/466 |
| 2005/0236544 A1* | 10/2005 | Mancino et al. | 248/304 |
| 2007/0056921 A1* | 3/2007 | Lo | 211/94.01 |
| 2007/0079561 A1* | 4/2007 | Hopkins | 52/36.5 |
| 2007/0181517 A1 | 8/2007 | Perkins et al. | |
| 2007/0251904 A1* | 11/2007 | Winig et al. | 211/106.01 |
| 2008/0257841 A1* | 10/2008 | Abernathy | 211/87.01 |
| 2009/0014401 A1* | 1/2009 | Tallman | 211/106.01 |
| 2009/0134290 A1* | 5/2009 | Begic et al. | 248/222.13 |
| 2010/0326930 A1* | 12/2010 | Chiang | 211/26 |
| 2011/0226919 A1* | 9/2011 | Fryzek et al. | 248/298.1 |
| 2011/0260026 A1* | 10/2011 | Ye et al. | 248/298.1 |
| 2011/0271438 A1 | 11/2011 | Yang et al. | |
| 2012/0091086 A1* | 4/2012 | Gregory et al. | 211/86.01 |
| 2012/0261362 A1* | 10/2012 | Skull et al. | 211/26 |
| 2014/0110365 A1* | 4/2014 | Bruegmann | 211/134 |
| 2014/0224753 A1* | 8/2014 | Shadwell et al. | 211/86.01 |

FOREIGN PATENT DOCUMENTS

| | | |
|---|---|---|
| JP | 60-36786 U | 3/1985 |
| JP | 60-133960 U | 9/1985 |
| JP | 62-9654 U | 1/1987 |
| JP | 11-159033 | 6/1999 |
| KR | 20-0219419 | 4/2001 |

* cited by examiner

HANGER PANEL AND HANGER DEVICE USING THE SAME

BACKGROUND OF THE INVENTION

1. Field of the Invention

The present invention relates to a hanger panel which assists in hanging or supporting a variety of articles, such as a tablet Personal Computer (PC), a smart phone, a cup holder, a pencil holder, etc., to a desk, a wall, or the like, and a hanger device using the same.

2. Description of the Related Art

Typically, a variety of articles, such as household items, office supplies, etc., are hung on a wall in homes and offices. Moreover, efforts to attach or hang even a bulky article, such as a monitor, etc., to a wall or a partition in order to attain an increased available space over a desk have been attempted because recent generalized use of a computer causes a narrower space above a desk or a table.

In exhibition places and stores for sales of goods, displaying goods by hanging the goods on a wall may increase purchasing power and advertisement effects, and therefore a hanger device for display of goods is of great importance.

Conventionally, in homes or exhibition places, goods have been displayed using clothes hangers or other hangers that are hung on a wall via nails. However, this conventional display method is not suitable to achieve decorative effects and to display a great number of goods, and cannot ensure an aesthetically pleasing appearance because the wall is directly exposed.

To solve the aforementioned problems, technologies in which a hanger panel in the form of a plywood board is attached to a wall are disclosed in the related art. In one example, as illustrated in FIG. 20, a conventional hanger panel, designated by reference numeral 100, is provided with a plurality of hanging grooves 101, which are longitudinally formed and are spaced apart from one another by a constant distance, and hooks 110 used to hang articles on the hanger panel 100 are detachably inserted into the hanging grooves 101. In this case, the hanger panel 100 is attached to a wall using fasteners 120 that penetrate the hanging grooves 101.

However, the above described conventional hanger panel 100 is formed of a single plywood board, which may cause a laborious task because a user has to cut the plywood board so as to conform to a desired space if the board is not suited to the width of a wall and the desired space. Moreover, since the hanger panel 100 is essentially wide and large, and thus is heavy, the hanger panel 100 may easily fall from a wall, and consequently may suffer from deterioration in exhibition efficiency because it is impossible to hang a number of goods on the hanger panel 100.

In addition, attaching a monitor to a partition in order to expand an office space over a desk has recently been attempted. One of these technologies is disclosed in Korean Registered Utility Model No. 20-0259617, entitled by 'PARTITION FOR USE AS MONITOR HANGER'. As illustrated in FIG. 21, a partition for use as a monitor hanger includes a guide rail 30 that is installed to a front surface of the partition so as to extend in a transverse direction, and a slider 45 that is coupled to the guide rail 30 and is slidable in a transverse direction, such that a slim liquid crystal monitor 5 can be mounted to a front surface of the slider 45.

However, the above described related art has a shortage of stability with regard to support of the monitor, which may result in a risk of fall and breakage of the monitor. In addition, the guide rail 30 has difficulty in separation and installation thereof as well as difficulty in hanging goods thereon or removing goods therefrom. A requirement for attaching the monitor to the partition is that the partition has to be located near a desk or a table, which results in a restraint in utilization of a space and a somewhat stuffy office space.

SUMMARY OF THE INVENTION

Therefore, the present invention has been made in view of the above problems of the related art, and it is an object of the present invention to provide a hanger panel, which may be attached to a desk, a table, or a wall to allow a variety of articles, such as a tablet PC, a smart phone, a cup holder, a pencil holder, etc., to be hung on or caught by the hanger panel.

It is another object of the present invention to provide a hanger panel, which is formed of a light and highly durable material capable of providing a clean outer appearance, which has the same shape at upper and lower sides thereof and the same shape at front and rear sides thereof and thus is usable in any direction, and which allows a plurality of hanger panels to be longitudinally connected to one another or to be vertically arranged one above another according to user needs.

It is another object of the present invention to provide a hanger device using a hanger panel, in which the hanger panel may be vertically moved in a state in which the hanger device is erected on a table or a desk or is attached to a wall, and the hanger panel ensures easy attachment or detachment of articles.

It is a further object of the present invention to provide a hanger device using a hanger panel, which may prevent the hanger panel from being unintentionally separated from a desk or a wall, and may prevent sudden fall or breakage of articles attached to the hanger panel.

In accordance with an aspect of the present invention, the above and other objects can be accomplished by the provision of a hanger panel including a rectangular panel body of a hollow type, the interior of which is empty, upper and lower hanging grooves longitudinally formed respectively in upper and lower surfaces of the panel body, and one or more front hanging grooves and rear hanging grooves longitudinally formed in front and rear surfaces of the panel body.

The front and rear hanging grooves may be vertically alternately arranged, and each of the upper and lower hanging grooves and the front and rear hanging grooves may include a grooved portion having a predetermined depth, and a neck portion provided with two extensions protruding toward each other from an inner surface of the grooved portion.

One or more hollow pipes may be longitudinally integrated in the panel body. Accordingly, a plurality of hanger panels may be longitudinally connected to one another using the hollow pipes. The hanger panel may be attached to a wall or be erected on a desk or a table when in use.

In accordance with another aspect of the present invention, a hanger device includes a hanger panel provided with a plurality of hanging grooves, two stands spaced apart from each other in parallel by a predetermined distance to support the hanger panel, and a slide fixing member coupled to each stand so as to be vertically slidable along the stand, the slide fixing member serving to fix the hanger panel to the stand.

Each of the stands may include two pillar members arranged on a table or a desk and spaced apart from each other by a predetermined distance, the two pillar members being integrally provided at facing surfaces thereof with guide blades to guide the slide fixing member.

The slide fixing member may include guide grooves formed in left and right surfaces thereof, into which the guide blades formed at the facing surfaces of the two pillar members are inserted, and an unlocking member configured to pull a fixing plate, which is inserted into the hanging groove of the hanger panel, so as to fix the hanger panel to the stand.

The slide fixing member may further include an elastic friction member configured to increase friction between the slide fixing member and the guide blades, so as to fix the slide fixing member to the stand.

The slide fixing member may further include a ball plunger configured to be inserted into one of fixing recesses arranged in a line along the pillar member, so as to fix the slide fixing member to the stand.

The unlocking member may include the fixing plate configured to be inserted into the hanging groove, and a cam pivot member configured to pull the fixing plate toward the slide fixing member so as to fix the hanger panel to the stand.

The cam pivot member may include a cam washer configured to come into contact with the guide blades, a fixing rod connected to the fixing plate and configured to penetrate the cam washer, a cam rotatably coupled to one end of the fixing rod, the cam having a cam surface to apply pressure to the cam washer, and a lever protruding from one side of the cam.

A compression spring may be installed on an outer circumferential surface of the fixing rod so as to be located between the cam washer and the fixing plate, and serves to continuously push the fixing plate, which is movable on the fixing rod, toward a tip end of the fixing rod.

The elastic friction member may include a friction member configured to come into contact with the guide blades, and a leaf spring configured to continuously apply pressure to the friction member.

The ball plunger may include a ball configured to be inserted into the fixing recess, a fixing pin in which the ball is fixedly seated, a spring configured to apply pressure to the fixing pin, and a cylindrical case in which the fixing pin and the spring are accommodated.

The hanger panel may include a rectangular panel body of a hollow type, the interior of which is empty, upper and lower hanging grooves longitudinally formed respectively in upper and lower surfaces of the panel body, and one or more front hanging grooves and rear hanging grooves longitudinally formed in front and rear surfaces of the panel body.

A hanger bracket may be installed to the hanger panel such that a variety of articles are hang on or supported by the hanger bracket. The hanger bracket may include a fixing plate having a predetermined size, the fixing plate being configured to come into close contact with the hanger panel, a U-shaped fixing portion integrally formed at an upper end of the fixing plate, the U-shaped fixing portion being inserted into an upper one of the two hanging grooves of the hanger panel vertically spaced apart from each other by a predetermined distance, a hook configured to be inserted into a lower one of the two hanging grooves formed in the hanger panel, and a hook pivot member configured to vertically pivot the hook so as to fix or release the hanger bracket to or from the hanger panel.

The hook pivot member may include a hook bar extending from one end of the hook, a rotating shaft configured to vertically pivotally support the hook bar, an elastic member configured to continuously push the hook bar downward from the rear side of the rotating shaft, and a handle installed to the end of the hook bar.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

First, prior to entering a detailed description of the present invention, a description of known technologies or configurations with regard to the present invention will be omitted herein in the case in which it is judged that such description may make the subject matter of the present invention rather unclear.

In addition, the terms used in the following description are selected in consideration of the functions in accordance with the present invention, and may be replaced by other terms based on intentions of users or managers, or customs, or the like. Therefore, these terms should be defined based on the whole content of this specification that explains a hanger panel and a hanger device devised to improve an office environment according to the present invention.

Hereinafter, a hanger panel and a hanger device using the same according to the present invention will be described in detail with reference to the accompanying drawings.

Figure 1:
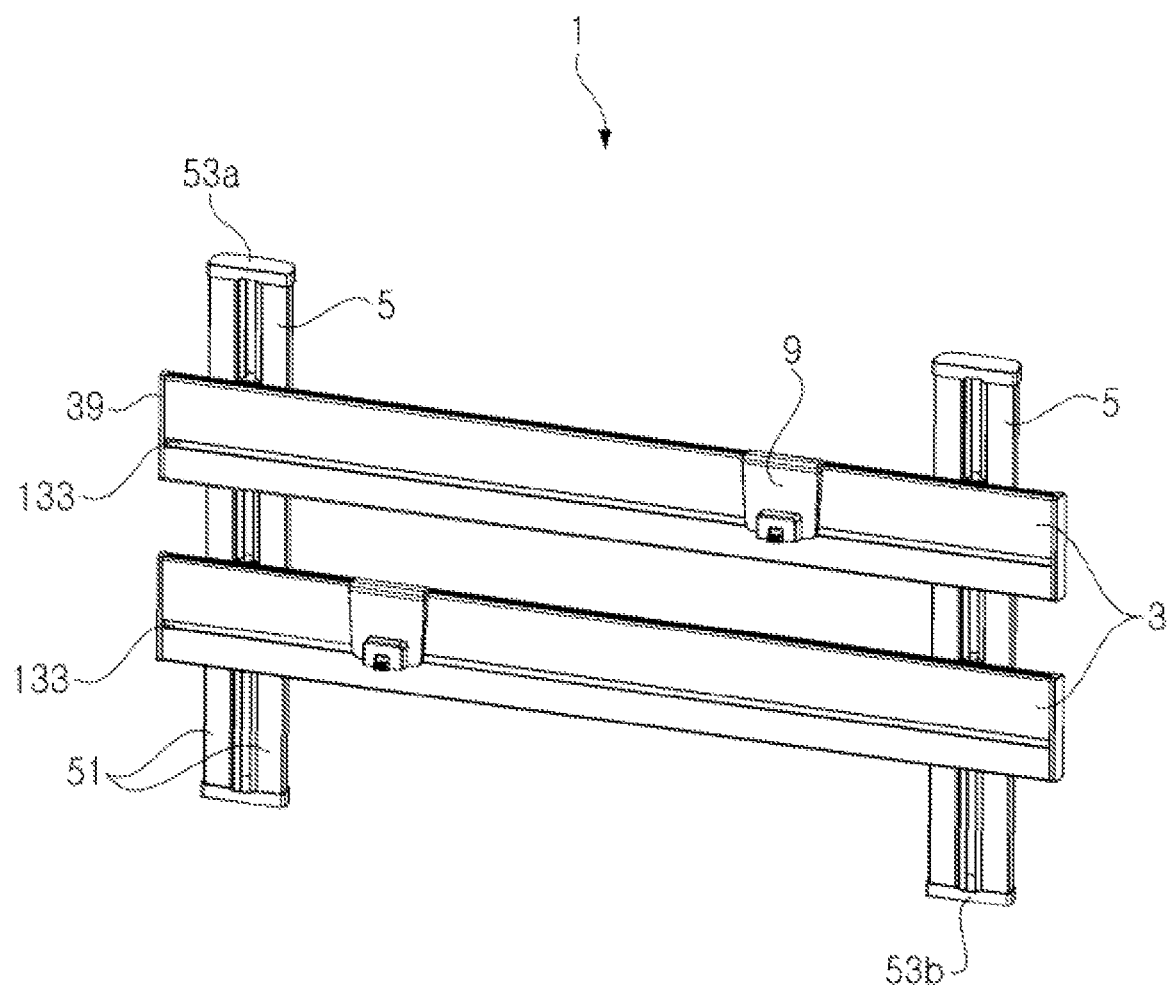
FIG. 1 is a front view showing a hanger device using a hanger panel according to the present invention.
Figure 2:
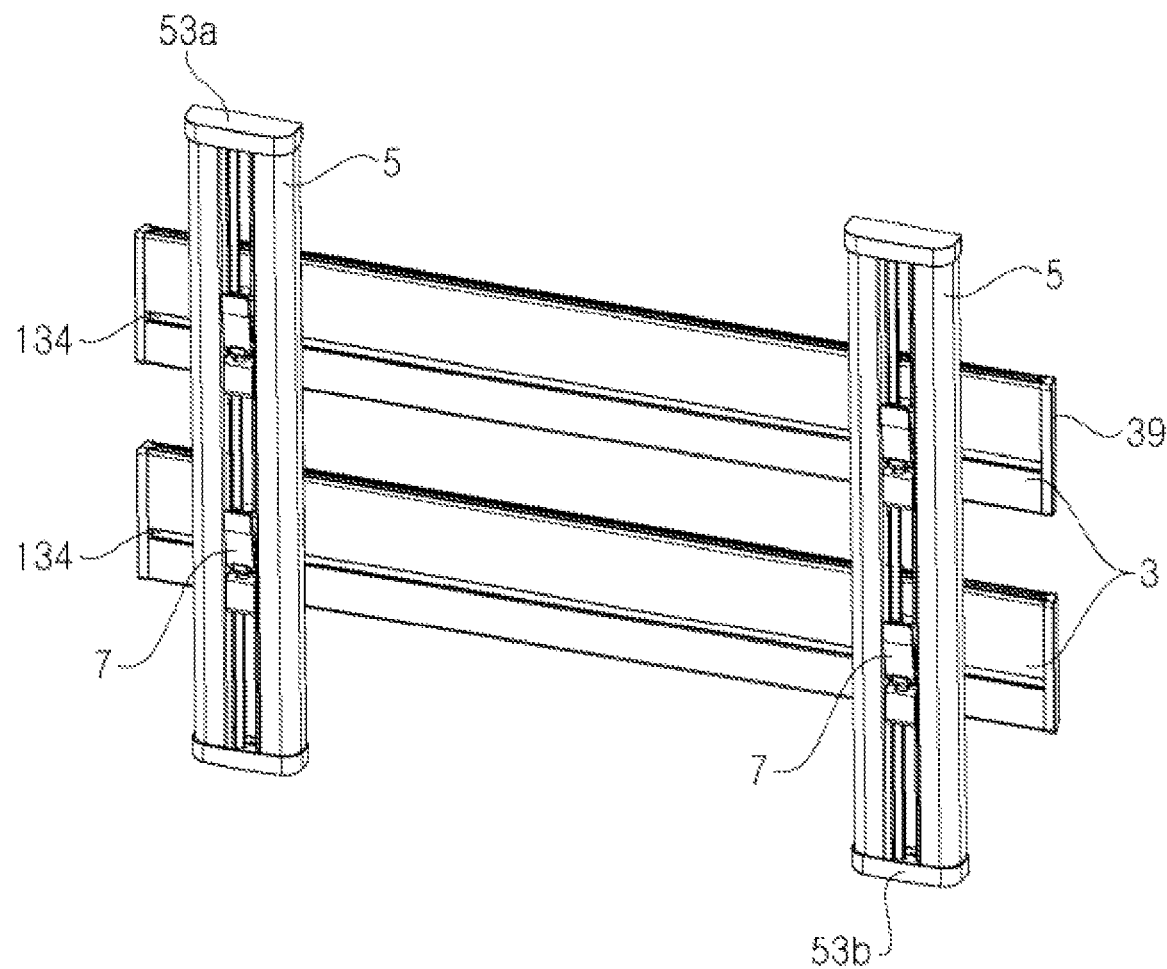
FIG. 2 is a rear view showing the hanger device using the hanger panel shown in FIG. 1.

FIGS. 1 and 2 show a preferred embodiment of a hanger device 1 using a hanger panel 3 according to the present invention. As shown, the hanger device 1 using the hanger panel 3 of the present invention is comprised of at least one hanger panel 3, two stands 5 installed to support the hanger panel 3, and slide fixing members 7 configured to fix the hanger panel 3 to the stands 5 respectively.

The hanger panel 3 may be a rectangular panel having a plurality of hanging grooves 30. The hanger panel 3 may be configured to allow a variety of articles, such as a tablet PC, a smart phone, a cup holder, a pencil holder, etc., to be hung on the hanger panel 3 using the hanging grooves 30.

Figure 3:
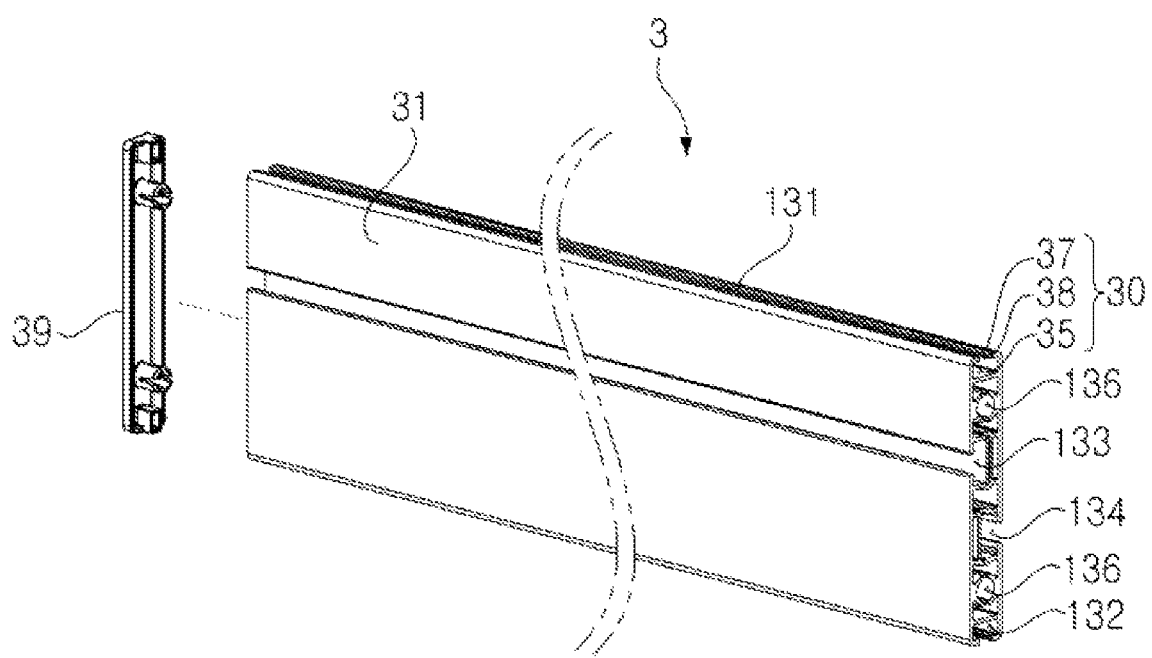
FIG. 3 is a perspective view showing a configuration of a hanger panel according to the present invention.

Referring to FIG. 3, the hanger panel 3 in the form of a rectangular panel is longitudinally provided with the plurality of hanging grooves 30; 131, 132, 133 and 134, and may be of a hollow type, the interior of which is empty. It is desirable that the hanger panel 3 be fabricated by extrusion molding an aluminum alloy. A plurality of hollow pipes 136 is longitudinally embedded in the hanger panel 3. The hollow pipes 136 may serve to enhance the rigidity of the hanger panel 3. A connection rod (not shown) may be inserted into each of the hollow pipes 136 when it is desired to longitudinally connect two or more hanger panels 3 to each other.

More specifically, the hanger panel 3 consists of an elongated panel body 31 that is long in length and is narrow in width and has a small thickness, and the plurality of hanging grooves 30 formed in the panel body 31. That is, the hanging grooves 30 include an upper hanging groove 131 and a lower hanging groove 132 formed individually in an upper surface and a lower surface of the panel body 31, and a front hanging groove 133 and a rear hanging groove 134 formed individually in a front surface and a rear surface of the panel body 31. It is desirable that one or more front hanging grooves 133 and one or more rear hanging grooves 134 be provided.

All of the upper hanging groove 131, the lower hanging groove 132, the front hanging groove 133, and the rear hanging groove 134 are arranged in parallel to one another and extend in a longitudinal direction of the panel body 31. In addition, the front hanging groove 133 and the rear hanging groove 134 are vertically alternately formed in the front surface and the rear surface of the panel body 31. That is, the front hanging groove 133 and the rear hanging groove 134 do not overlap each other at the same height, which results in a minimized thickness of the panel body 31. In the hanger panel 3 of the present invention, as a result of forming the hanging grooves 30 in the upper and lower surfaces as well as the front and rear surfaces of the panel body 31, the hanger panel 3 may be used without differentiation of front and rear sides as well as upper and lower sides. Not described reference numeral 39 denotes a protective cap that is provided at either lateral end of the hanger panel 3.

More specifically, each of the hanging grooves 30 formed in the panel body 31 consists of a grooved portion 35 and a neck portion 38. The grooved portion 35 defines a rectangular groove having a constant depth, and extends in a longitudinal direction of the panel body 31. The grooved portion 35 may be shaped to allow a variety of elements, such as, for example, a fixing plate that will be described hereinafter, to be fixed thereto. In addition, the grooved portion 35 may allow the element inserted thereinto to be longitudinally moved. That is, the element fixed to the grooved portion 35 may be horizontally moved as necessary. The neck portion 38 is defined by two extensions 37, which protrude toward each other from an inner surface of the grooved portion 35. The neck portion 38 has a smaller width than that of the grooved portion 35, which may prevent, for example, the fixing plate inserted in the grooved portion 35 from being unintentional separated from the grooved portion 35.

As described above, the hanger panel 3 of the present invention may be attached to a wall, or may be erected on a desk or a table when in use. In one example, to attach the hanger panel 3 of the present invention to a wall, a separate fixing means may be necessary. In another example, to erect the hanger panel 3 of the present invention on a table, a separate stand may be necessary. The fixing means to fix the hanger panel 3 to a wall is widely known in the art, and thus a detailed description thereof will be omitted herein.

Hereinafter, the hanger device 1 including stands to erect and fix the hanger panel 3 on a desk or a table will be described. Referring again to FIGS. 1 and 2, the hanger device 1 according to the present invention is comprised of the at least one hanger panel 3 having the plurality of longitudinal hanging grooves 30 arranged in parallel to one another, and the stands 5 installed to erect and fix the hanger panel 3 on a table (or to attach the hanger panel 3 to a wall). However, it is noted that various alternative configurations of the stands that are used to fix the hanger panel 3 to a wall or to erect and fix the hanger panel 3 on a table are possible, and therefore the stands used to fix the hanger panel 3 are not limited to the shown example.

Figure 4:
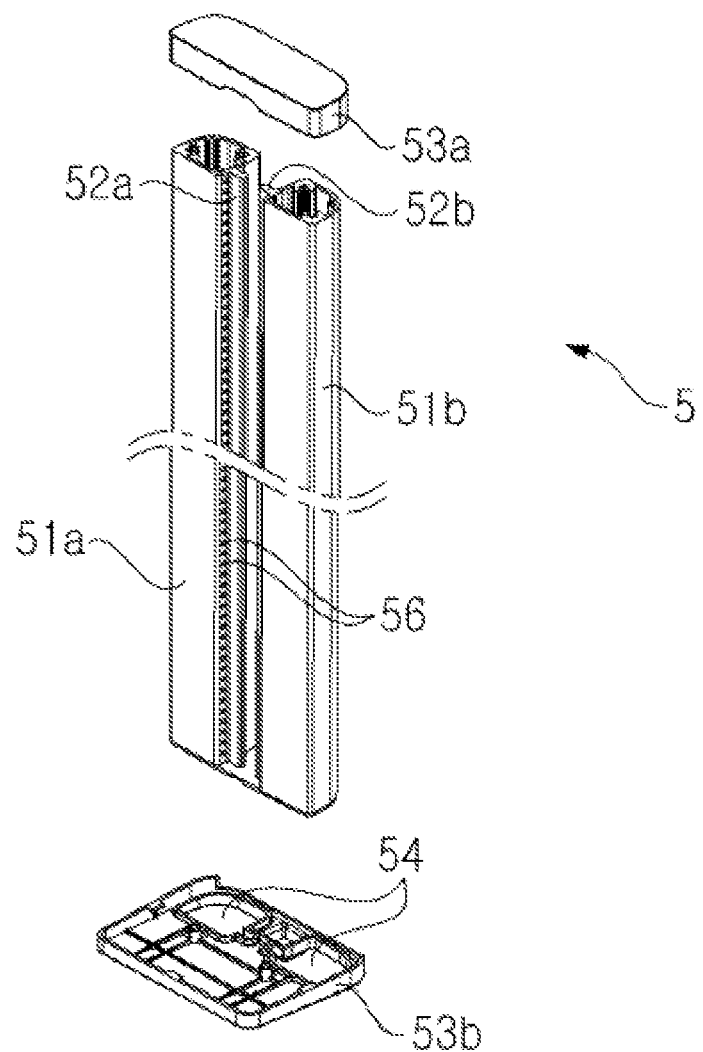
FIG. 4 is an exploded perspective view showing a configuration of a stand according to the present invention.

Referring to FIG. 4, each of the stands 5 according to the present invention may include two pillar members 51 which are spaced apart from each other by a predetermined distance and extend vertically at parallel positions. It is desirable that the pillar members 51 take the form of hollow rectangular pipes formed by extrusion molding an aluminum alloy.

The pillar members 51; 51a and 51b are integrally formed at facing surfaces thereof with guide blades 52; 52a and 52b. The guide blades 52 are formed respectively at the center of the pillar members 51 so as to extend vertically. The two guide blades 52, arranged to face each other, are spaced apart from each other by a predetermined distance such that a main body 71 of the slide fixing member 7 that will be described hereinafter may be inserted between the two guide blades 52.

Fixing caps 53; 53a and 53b are respectively fitted to upper and lower ends of each stand 5 consisting of the two pillar members 51. The fixing caps 53 serve to assist maintain the two pillar members 51 in maintaining a predetermined distance therebetween. Each of the fixing caps 53 has two insertion recesses 54, into which upper ends or lower ends of the two pillar members 51 are inserted respectively.

The slide fixing member 7 is installed to the stand 5 and serves to fix the hanger panel 3 to the stand 5. The slide fixing member 7 is vertically movably installed between the two pillar members 51 and serves to fix the hanger panel 3 to the stand 5.

Figure 5:
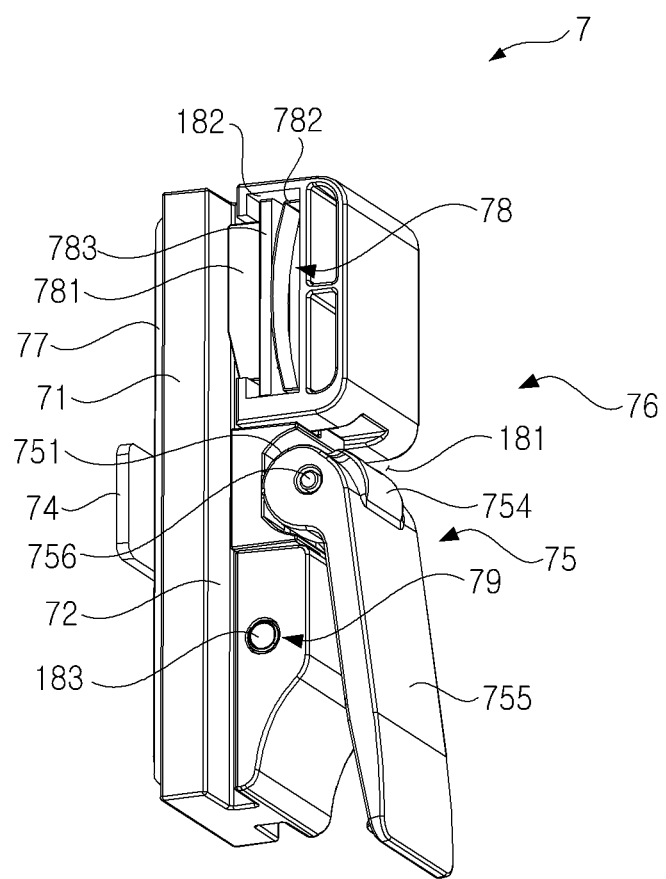
FIG. 5 is a perspective view showing a slide fixing member according to the present invention.
Figure 6:
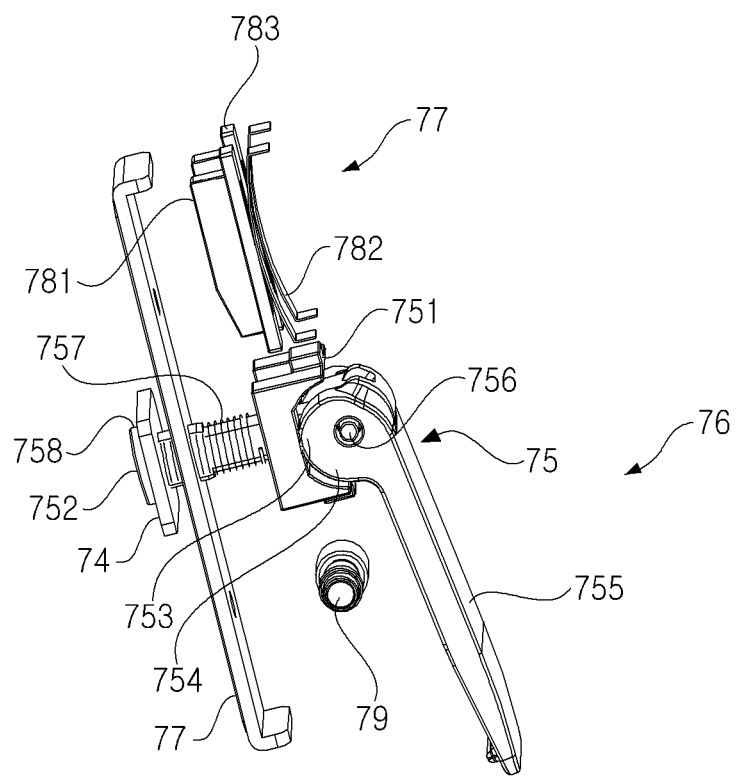
FIG. 6 is an exploded perspective view showing an internal configuration of the slide fixing member shown in FIG. 5.
Figure 7:
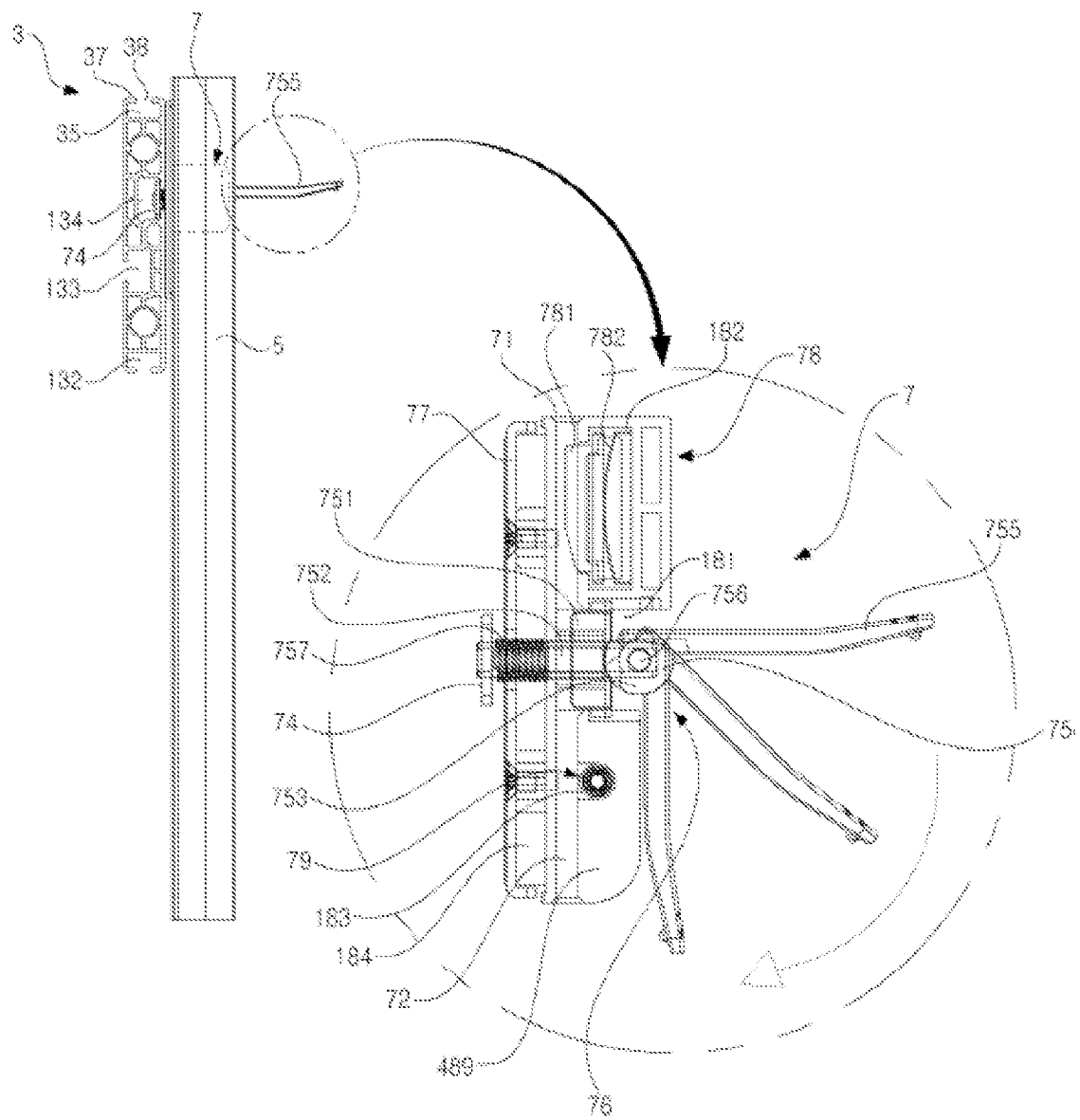
FIG. 7 is a sectional view and an enlarged view showing operation of the slide fixing member shown in FIG. 5.

The slide fixing member 7, as illustrated in FIGS. 5 to 7, includes the main body 71 having guide grooves 72 formed in left and right surfaces thereof, into which the guide blades 52 of the two pillar members 51 are inserted respectively. The guide grooves 72 are formed in the center of both the lateral surfaces of the main body 71 so as to extend in a longitudinal direction of the main body 71.

The main body 71 is fabricated by injection molding plastics and has a plurality of mounting spaces 181, 182, 183 and 184 having different shapes. For example, as illustrated in FIG. 7, the first mounting space 181 is formed in the center of the main body 71, the second mounting space 182 is formed in an upper end of the main body 71, the third mounting space 183 is formed in a lower end of the main body 71, and the fourth mounting space 184 is formed along a lower surface of the main body 71. It is desirable that the mounting spaces be obtained during injection molding of the main body 71.

The first mounting space 181 is configured to accommodate an unlocking member 76, the second mounting space 182 is configured to accommodate an elastic friction member 78, the third mounting space 183 is configured to accommodate a ball plunger 79, and the fourth mounting space 184 is configured to accommodate a support plate 77.

More specifically, the first mounting space 181 defined in the main body 71 has an open top side and an open bottom side, the open bottom side of the first mounting space 181 being in communication with the guide grooves 72 formed in the main body 71. The unlocking member 76, accommodated in the first mounting space 181, serves to pull the fixing plate 74, which is inserted into the hanging groove 30 of the hanger panel 3 as will be described hereinafter, toward the stand 5, so as to fix the hanger panel 3 to the stand 5.

To this end, the unlocking member 76 consists of the fixing plate 74 inserted into the hanging groove 30, and a cam pivot member 75 that serves to pull the fixing plate 74 toward the slide fixing member 7 so as to allow the hanger panel 3 to come into close contact with the stand 5 to thereby be fixed to the stand 5.

The cam pivot member 75 consists of a cam washer 751 that comes into contact with lateral surfaces of the guide blades 52 inserted in the guide grooves 72, a fixing rod 752 that is connected to the fixing plate 74 and penetrates the cam washer 751, a cam 754 that is rotatably coupled to an upper end of the fixing rod 752 and has a cam surface 753 that applies pressure to the cam washer 751, and a lever 755 that protrudes from one side of the cam 754. In this case, the cam 754 is eccentrically installed to the rotating shaft 756.

If the lever 755 is pulled downward about the cam 754 as an eccentric cam, the fixing rod 752 is pivotally lifted by the lever 755, whereby the fixing plate 74 is pulled toward the slide fixing member 7. In contrast, if the lever 755 is pulled upward, the fixing rod 752 is released, and consequently the fixing plate 74 coupled to the fixing rod 752 is moved to a tip end of the fixing rod 752 by elasticity of a compression spring 757 that will be described hereinafter.

More specifically, if the lever 755 of the cam pivot member 75 is pulled downward, the fixing plate 74 is brought into close contact with an inner surface of the hanging groove 30, thereby causing the hanger panel 3 to be fixed to the stand 5, and simultaneously the slide fixing member 7 to be brought into close contact with and fixed by the stand 5. In contrast, if the lever 755 is pulled upward, the fixing plate 74 is separated from the inner surface of the hanging groove 30, thereby causing the hanger panel 3 to be separated from the stand 5 and the slide fixing member 7 to be vertically movable.

In this case, the compression spring 757 is installed on an outer circumferential surface of the fixing rod 752 so as to be located between the cam washer 751 and the fixing plate 74, and serves to continuously apply pressure to the fixing plate 74. Accordingly, since the compression spring 757 continuously applies pressure to the fixing plate 74, the compression spring 757 acts to push the fixing plate 74 to the tip end of the fixing rod 752 when the fixing rod 752 is moved away from the cam washer 751. In addition, the fixing rod 752 is provided at the tip end thereof with a stopper 758 to prevent separation of the fixing plate 74.

Accordingly, if the lever 755 is pulled upward to release the fixing rod 752, a constant distance is created between the fixing plate 74 and a lower surface of the main body 71 because the fixing plate 74 is located at the tip end of the fixing rod 752, which allows the fixing plate 74 to be easily inserted into the hanging groove 30 of the hanger panel 3. In this case, the support plate 77, which is accommodated in the fourth mounting space 184, is formed of a metal plate having approximately the same size as that of the main body 71. The support plate 77 may serve to increase the rigidity of the main body 71 as well as coupling force between the hanger panel 3 and the main body 71.

The second mounting space 182 has a closed top side, open left and right sides, and an open bottom side in communication with the guide grooves 72. The second mounting space 182 accommodates an elastic friction member 78 that comes into contact with the guide blades 51 inserted into the guide grooves 72. The elastic friction member 78 serves to increase friction with the guide blades 51, thereby ensuring stable fixing of the slide fixing member 7.

Referring again to FIGS. 5 to 8, the elastic friction member 78 consists of the friction member 781, which is vertically movably accommodated in the second mounting space 182 and takes the form of a block that comes into contact with the guide blades 52 of the pillar members 51, and a leaf spring 782 accommodated in the second mounting space 182 to apply pressure to an upper surface of the friction member 781.

The friction member 781 is formed by injection molding plastics, and is provided at a lateral surface thereof with a holding protrusion 783 to prevent the friction member 781 from being separated from the second mounting space 182. The leaf spring 782, accommodated in the second mounting space 182, has an arcuate shape and serves to push the friction member 781 toward the guide blades 52 inserted into the guide grooves 72.

In the present invention, the elastic friction member 78 serves to prevent the slide fixing member 7 from being separated from the stand 5 even in a state in which the unlocking member 76 is released. That is, since the friction member 781 is brought into close contact with the lateral surfaces of the guide blades 52 by elasticity of the leaf spring 782, it is possible to prevent fall of the slide fixing member 7 even if the unlocking member 76 is released. This is very important to ensure implementation of a normal operation of the slide fixing member 7. Therefore, installation or vertical movement of the hanger panel 3 is possible in a state in which the user releases the slide fixing member 7.

In the present invention, the third mounting space 183 having a cylindrical shape is formed in both lateral sides of the main body 71. The third mounting space 183 is configured to accommodate the ball plunger 79. The ball plunger 79 is configured to be inserted into one of fixing recesses 56 that are arranged in a line along a lateral surface of the pillar member 51 and are spaced apart from one another by a constant distance.

Figure 8:
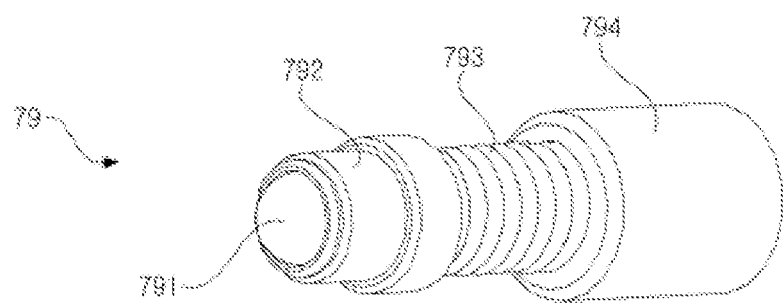
FIG. 8 is a perspective view showing one example of a ball plunger according to the present invention.

The ball plunger 79, as illustrated in FIG. 8, includes a spherical ball 791 inserted into the fixing recess 56, a fixing pin 792 in which the ball 791 is fixedly seated, a spring 793 to apply pressure to the fixing pin 792, and a cylindrical case 794 in which the fixing pin 792 and the spring 783 are accommodated. That is, the cylindrical case 794 is tightly accommodated in the third mounting space 183.

With the above described configuration, if the ball 791, seated in a tip end of the fixing pin 792, is inserted into one of the fixing recesses 56 at an arbitrary position, the slide fixing member 7 may be kept stationary at the position. In addition, if the user attempts to forcibly move the slide fixing member 7 upward or downward, noise is generated as the ball 791 passes through the fixing recesses 56. The ball plunger 79 serves not only to prevent fall of the hanger panel 3, but also to determine a vertical position of the slide fixing member 7.

As described above, the hanger device 1 using the hanger panel 3 according to the present invention may be installed to a wall, a desk, or the like and may be used to hang a variety of articles, such as a tablet PC, a smart phone, a cup holder, a pencil holder, etc. In addition, the hanger device 1 may be used for storage or exhibition of a variety of articles including household items and office supplies, for example. In addition, a plurality of hanger panels 3 may be longitudinally connected to one another or be vertically arranged one above another according to user needs, which ensures free adjustment in the size of the entire hanger device 1.

The hanger panel 3 of the present invention has the same shape at front and rear sides thereof and the same shape at upper and lower sides thereof, and thus may be used without differentiation of front and rear sides as well as upper and lower sides. In the case in which a plurality of hanger panels 3 in the form of boards is installed along an edge of a desk or a wall, the hanger panels 3 may serve a decorative wall or a partition.

Figure 9:
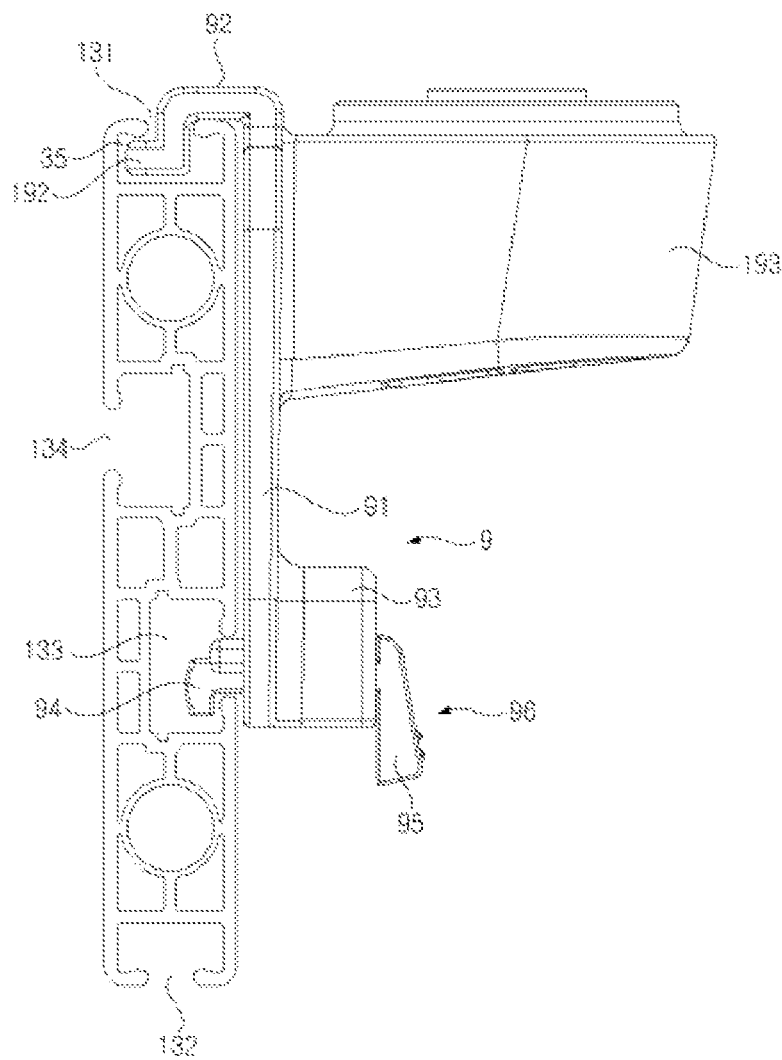
FIG. 9 is a side view showing a hanger bracket according to the present invention.
Figure 10:
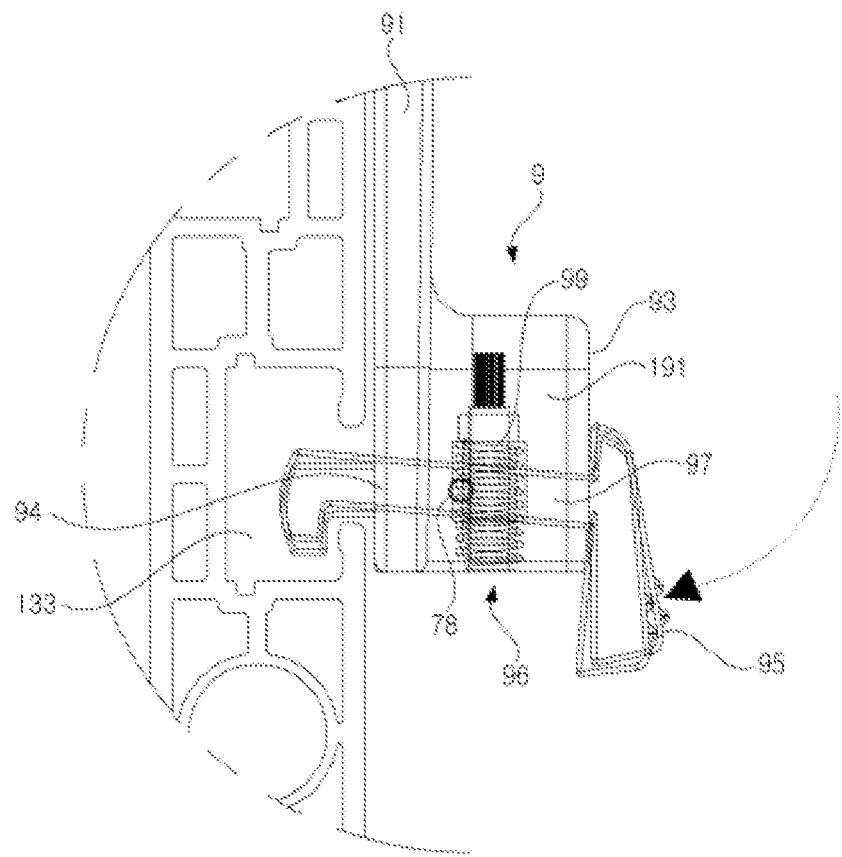
FIG. 10 is a sectional view of the hanger bracket shown in FIG. 9.

Hereinafter, one embodiment of a hanger bracket 9 according to the present invention will be described with reference to FIGS. 9 and 10. The hanger bracket 9 may be installed to the front surface or the rear surface of the hanger panel 3, so as to allow a variety of articles to be hung on the hanger panel 3. The hanger bracket 9 is interposed between the hanger panel 3 and an article to assist the article in being attached to or supported by the hanger panel 3. However, various shapes of means to hang the article on the hanger panel 3 may be used, and therefore the hanger bracket 9 for use with the hanger device 1 according to the present invention is not limited to a configuration that will be described hereinafter.

As shown, the hanger bracket 9 is detachably attached to the front surface of the hanger panel 3. The hanger bracket 9 is provided at a rear surface thereof with a fixing portion 92 and a hook 94, which are inserted into the hanging groove 30 of the hanger panel 3, and is provided at a front surface thereof with fixing brackets or receiving containers for fixing or receiving articles.

More specifically, the hanger bracket 9 consists of a fixing plate 91, which has a predetermined size and is configured to come into close contact with the front surface or the rear surface of the hanger panel 3, the fixing portion 92, which is formed at an upper end of the fixing plate 91 and has an U-shaped form suitable to be inserted into the hanging groove 30; 131 formed in the upper surface of the hanger panel 3, the hook 94, which is vertically pivotally installed to a lower end of the fixing plate 91 and is inserted into the hanging groove 30; 133 formed in the front surface of the hanger panel 3, and a hook pivot member 96, which assists the hook 94 in being vertically pivotally rotated to fix the hook 94 to the hanging groove 30; 133 or to release the hook 94 from the hanging groove 30; 133.

The hook pivot member 96 is installed in a case member 93 that is in turn coupled to a lower end of a front surface of the fixing plate 91. The case member 93 is formed by injection molding plastics, and internally defines an installation space 191 for installation of the hook pivot member 96.

The hook pivot member 96 consists of a hook par 97 that extends from a rear end of the hook 94, a center shaft 98 that rotatably supports the center of the hook bar 97, a spring member 99 that is located at the rear of the center shaft 98 and serves to apply pressure to the hook bar 97, and a handle 95 that is installed to a rear end of the hook bar 97 and serves to vertically pivotally rotate the hook bar 97.

Accordingly, if the handle 95 is pushed downward, the hook bar 97 serves as a lever that is pivotally rotated about the center shaft 98. As the hook bar 97 is pivotally rotated, the hook 94 is pivotally lifted. In contrast, if the handle 95 is pushed upward, the hook 94 is pivotally lowered. In this case, owing to a downwardly bent tip end of the hook 94, if the hook 94 is lowered, the hook 94 is caught by the neck portion 38 of the hanging groove 30, thereby allowing the hanger bracket 9 to be firmly fixed to the hanger panel 3. In contrast, if the hook 94 is lifted, the tip end of the hook 94 may be easily separated from the neck portion 38 of the hanging groove 30, which allows the hanger bracket 9 to be separated from the hanger panel 3 or to be horizontally moved.

As described above, in the case of the hanger bracket 9 according to the present invention, the fixing portion 92 formed at the upper end of the fixing plate 91 and the hook 94 formed at the lower end of the fixing plate 92 are caught respectively by the two hanging grooves 30 of the hanger panel 3 that are vertically spaced apart from each other by a predetermined distance, for example, by the upper hanging groove 131 and the front hanging groove 133. Accordingly, the hanger bracket 9 may stably fix even a heavy article, such as a computer monitor, to the hanger panel 3. In particular, the fixing portion 92 is provided with a holding protrusion 192. The holding protrusion 192 protrudes laterally from the fixing portion 92 so as to be caught by the neck portion 38 of the hanging groove 30, which ensures that the fixing portion 92 is more stable fixed to the hanging groove 30.

Meanwhile, various shapes of fixing brackets or receiving containers may be installed to an upper end of the front surface of the fixing plate 91 for fixing or receiving articles. For example, as illustrated in FIG. 9, a fixing bracket 193 may be installed to the front surface of the fixing plate 91, such that a monitor pivot arm is fixed to the fixing bracket 193. In addition, various articles, such as a cup holder, a pencil holder, or a memo pad storage basket, etc., may be attached to the upper end of the front surface of the fixing plate 91.

Figure 11:
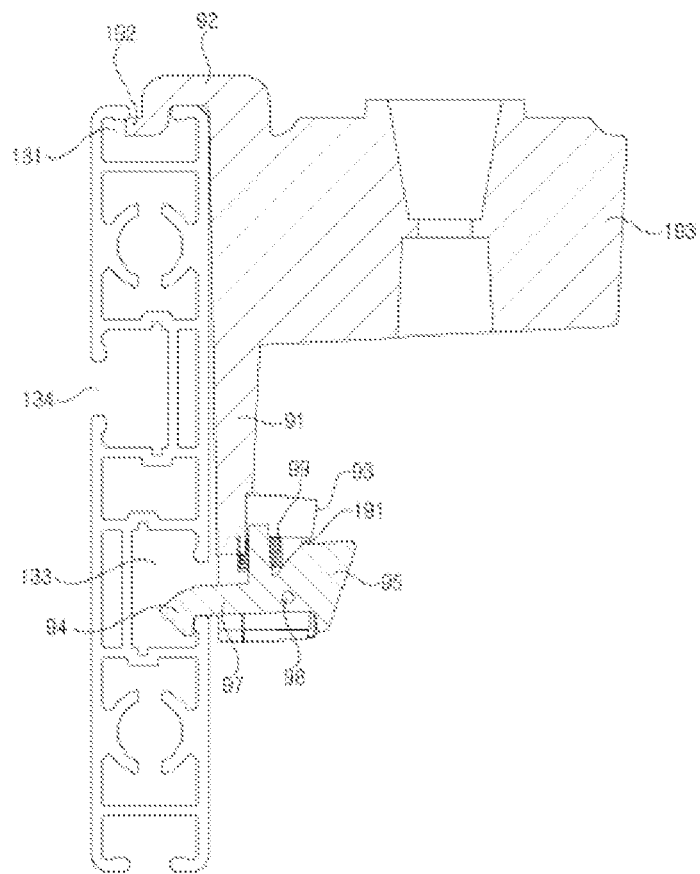
FIG. 11 is a sectional view showing another example of the hanger bracket according to the present invention.
Figure 12:
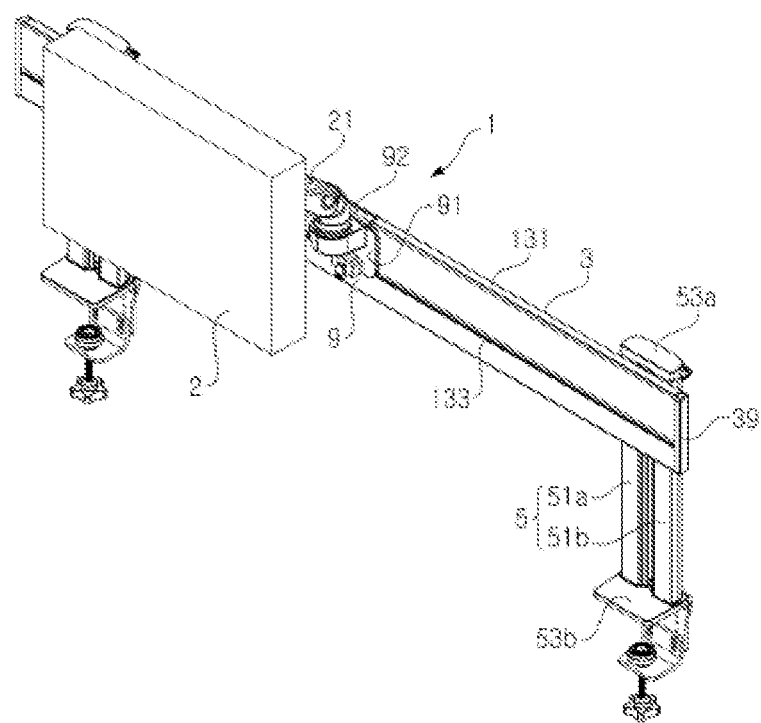
FIGS. 12 to 17 are respectively a perspective view, a front view, a rear view, a plan view, a side view, and an operational explanatory view showing an embodiment of a hanger device using a hanger panel according to the present invention.
Figure 13:
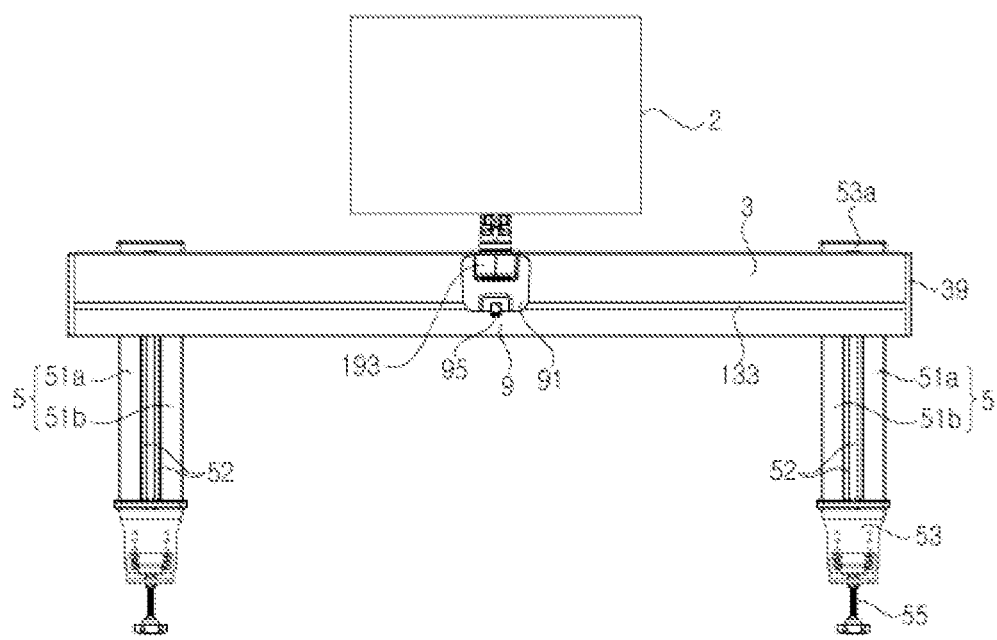
Figure 14:
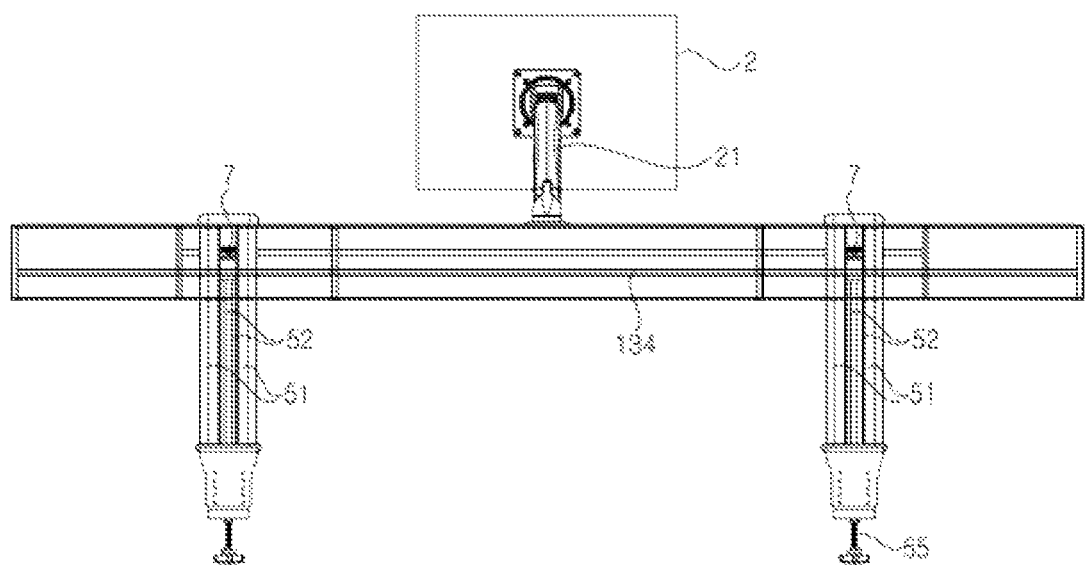
Figure 15:
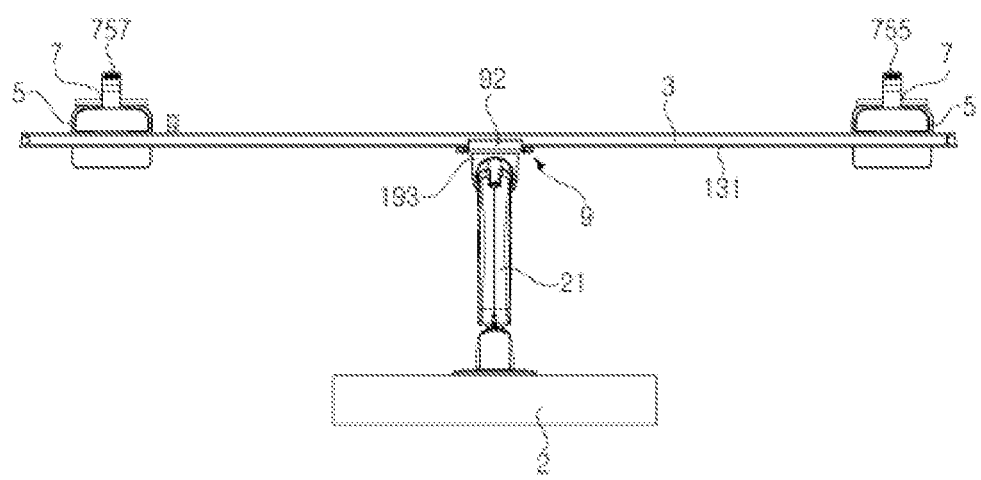
Figure 16:
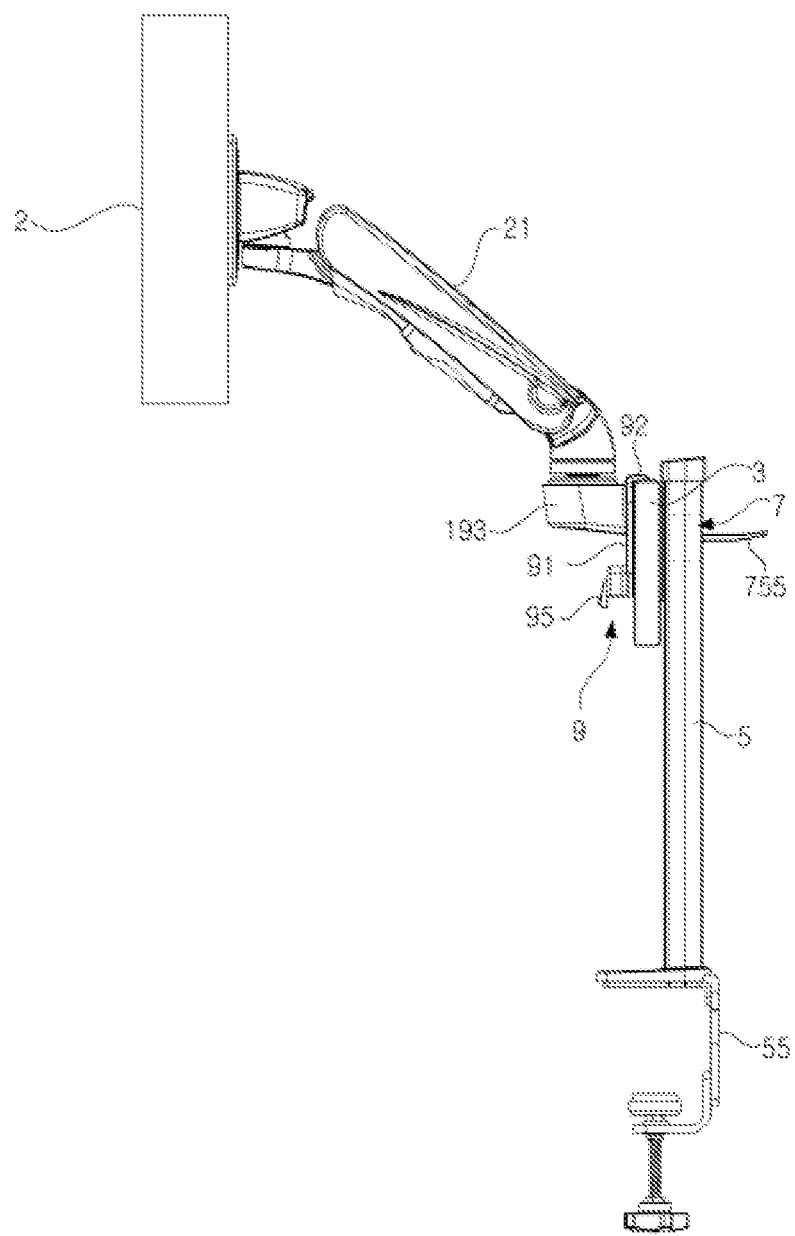

FIG. 11 illustrates another embodiment of the hanger bracket 9 according to the present invention. The hanger bracket of the present embodiment is similar to the above described hanger bracket 9, except for the fact that the center shaft 98 is installed to the rear end of the hook bar 97 and the spring member 99 is installed in front of the center shaft 98 so as to push the hook bar 97 downward. The other configurations of the present embodiment are equal to those of the above described embodiment, and thus a detailed description thereof will be omitted herein.

Hereinafter, the case in which a monitor is installed to the hanger device 1 of the present invention will be described. First, as illustrated in FIGS. 12 to 16, the two stands 5 are vertically erected on a top panel of a table so as to be spaced apart from each other by a predetermined distance.

The hanger panel 3 according to the present invention is horizontally installed between the two stands 5. In this case, the hanger panel 3 is fastened using the slide fixing members 7 that are installed respectively to the stands 5.

More specifically, the hanger panel 3 is a metal panel provided with the plurality of hanging grooves 30; 131, 132, 133, 134. The hanger panel 3 may have a length of about 1 m, a width of about 20 cm, and a thickness of about 2 cm. The hanging grooves 30 are formed respectively in the upper surface, the lower surface, the front surface and the rear surface of the hanger panel 3. Each of the hanging grooves 30 consists of the grooved portion 35 having a predetermined depth and the neck portion 38.

The stands 5 are vertically erected on edges of the top panel of the table. Each of the stands 5 includes two pillar members 51; 51a and 51b, and the guide blades 52 are formed at facing surfaces of the two pillar members 51. The upper fixing cap 53a is fitted to the upper end of the stand 5 and the lower fixing cap 53b is fitted to the lower end of the stand 5.

In this case, a clamp device 55 is installed to a lower surface of the lower fixing cap 53b and serves to fix the stand 5 to the top panel of the table. The clamp device 55 consists of a U-shaped bracket and an adjustment bolt. The clamp device 55 is widely used in the art, and thus a detailed description thereof will be omitted herein.

The slide fixing member 7 is fitted between the two pillar members 51. The slide fixing member 7 has the guide grooves 72, into which the guide blades 52 formed at the two pillar members 51 are inserted respectively. The slide fixing member 7 is inserted into the upper end or the lower end of the stand 5 and is vertically movable along the guide blades 52.

The slide fixing member 7 is provided with the unlocking member 76, the elastic friction member 78, and the ball plunger 79. The unlocking member 76 consists of the fixing plate 74 that is inserted into the hanging groove 134 formed in the rear surface of the hanger panel 3, the cam washer 751 that comes into close contact with the guide blades 52, the fixing rod 752 that is fixed to the fixing plate 74 and penetrates the cam washer 751, the compression spring 757 that is installed on the outer circumferential surface of the fixing rod 752 and serves to apply pressure to the fixing plate 74, the cam 754 that is rotatably installed to the rear end of the fixing rod 752 and has the cam surface 753 to apply pressure to the cam washer 751 or to release the cam washer 751, and the lever 755 that protrudes from one side of the cam 754.

With the above described configuration, if the lever 755 is pulled downward, the cam surface 753 of the cam 754 applies pressure to the cam washer 751, causing the cam washer 751 to be moved to the guide grooves 72 to thereby apply pressure to the guide blades 52 inserted in the guide grooves 72. In this way, the slide fixing member 7 is fixed to the stand 5. In contrast, if the lever 755 is pulled upward, the cam surface 753 of the cam 754 does not apply pressure to the cam washer 751 and the compression spring 757 acts to push the cam washer 751 upward. Thereby, the cam washer 751 is moved upward, thereby being separated from the guide blades 52. Accordingly, in such a state, the slide fixing member 7 is vertically movable along the guide blades 52.

Accordingly, the lever 755 is pulled upward to adjust a vertical position of the slide fixing member 7 installed to each of the two stands 5, and then the fixing plate 74 of the slide fixing member 7 is inserted into the hanging groove 134 formed in the rear surface of the hanger panel 3. Thereafter, if the lever 755 is pulled downward, the fixing rod 752 acts to strongly pull the fixing plate 74 toward the stand 5 until the fixing plate 74 comes into close contact with the inner surface of the rear hanging groove 134. In this way, as the rear surface of the hanger panel 3 is brought into close contact with the front surface of the stand 5, and simultaneously the cam washer 751 is brought into close contact with the guide blades 52, both the slide fixing member 7 and the hanger panel 3 may be fixed to the stand 5.

Meanwhile, the elastic friction member 78 consists of the friction member 781 that comes into close contact with the guide blades 52 and the leaf spring 782 that pushes the friction member 781 toward the guide blades 52. The elastic friction member 78 serves not only to prevent fall of the slide fixing member 7, but also to keep the slide fixing member 7 stationary at an arbitrary position.

The ball plunger 79 includes the ball 791 and the spring 793 that applies pressure to the ball 791. As the ball plunger 79 is inserted into one of the fixing recesses 56 that are arranged in a line along the lateral surface of the pillar member 51 and are spaced apart from one another by a constant distance, it is possible to prevent fall of the slide fixing member 7. In addition, the ball plunger 79 assists the user in coinciding heights of the two slide fixing members 7, which facilitates horizontal installation of the hanger panel 3.

After the hanger panel 3 is fixed to the stand 5 using the slide fixing member 7, the hanger bracket 9 may be mounted to the front surface of the hanger panel 3 to enable attachment of a monitor designated by reference numeral 2. That is, the hanger bracket 9 consists of the fixing plate 91 that is brought into close contact with the front surface of the hanger panel 3, the fixing portion 92 formed at the upper end of the fixing plate 91, the hook 94 formed at the lower end of the fixing plate 91, and the hook pivot member 96 to vertically pivotally rotate the hook 94.

Accordingly, if the hook 94 is inserted into the hanging groove 133 formed in the front surface of the hanger panel 3 in a state in which the fixing portion 92 of the hanger bracket 9 is inserted into the hanging groove 131 formed in the upper surface of the hanger panel 3, the hook 94 may be firmly caught by the neck portion 38 of the front hanging groove 133 without a risk of unintentional separation, and simultaneously the hanger bracket 9 is fixed to the hanger panel 3. In contrast, when it is desired to separate the hanger bracket 9 from the hanger panel 3 or to move the hanger bracket 9, the handle 755 of the hook pivot member 96 is pushed downward to allow the hook 94 to be released from the neck portion 38 of the front hanging groove 133.

Figure 17:
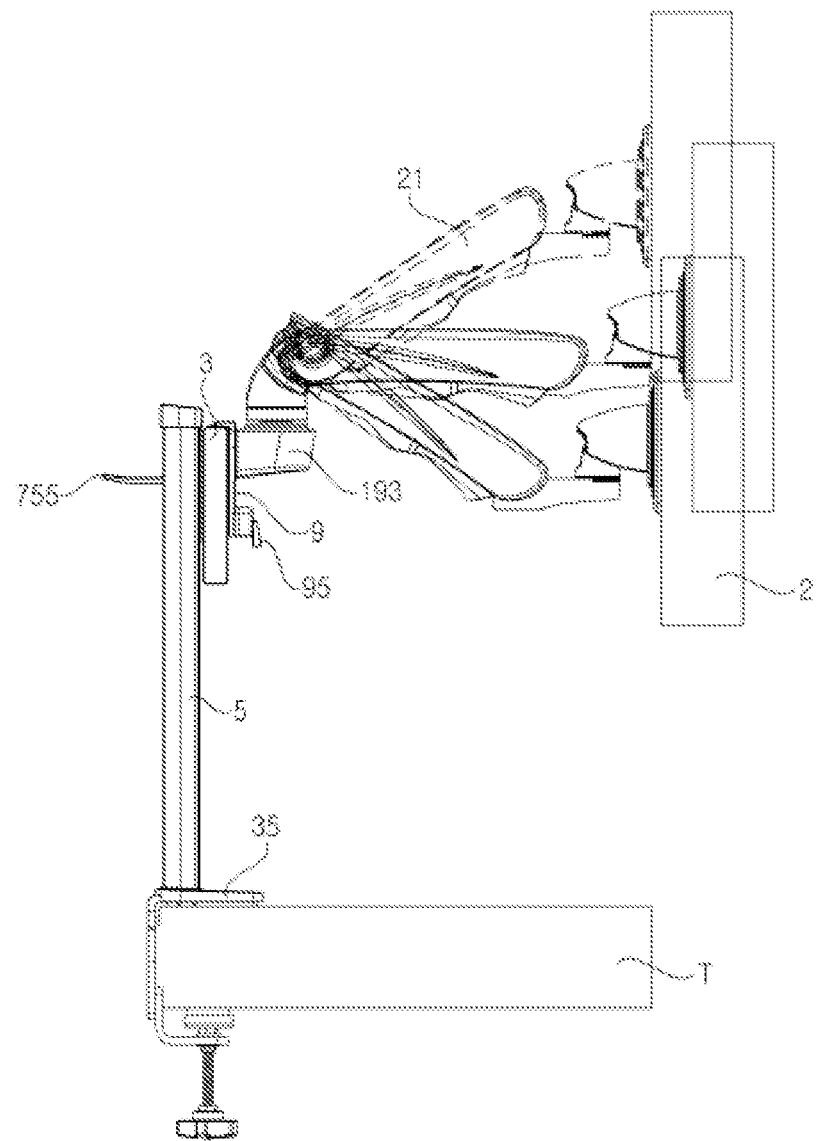

Once the hanger bracket 9 is fixed to the front surface of the hanger panel 3 as described above, the monitor 2 may be easily mounted to the hanger bracket 9 as a monitor pivot arm 21 is installed to the fixing bracket 193 formed at the upper end of the hanger bracket 9. In this way, the hanger device 1 according to the present invention may provide an increased office space over a table by allowing the monitor 2 to be attached to the hanger device 1 via the hanger panel 3, the stand 5, the hanger bracket 9, the fixing bracket 193, and the monitor pivot arm 21. As illustrated in FIG. 17, the monitor pivot arm 21 may be folded or unfolded to adjust a distance between the monitor 2 and the user, or to freely adjust the orientation angle of a screen of the monitor 2.

Figure 18:
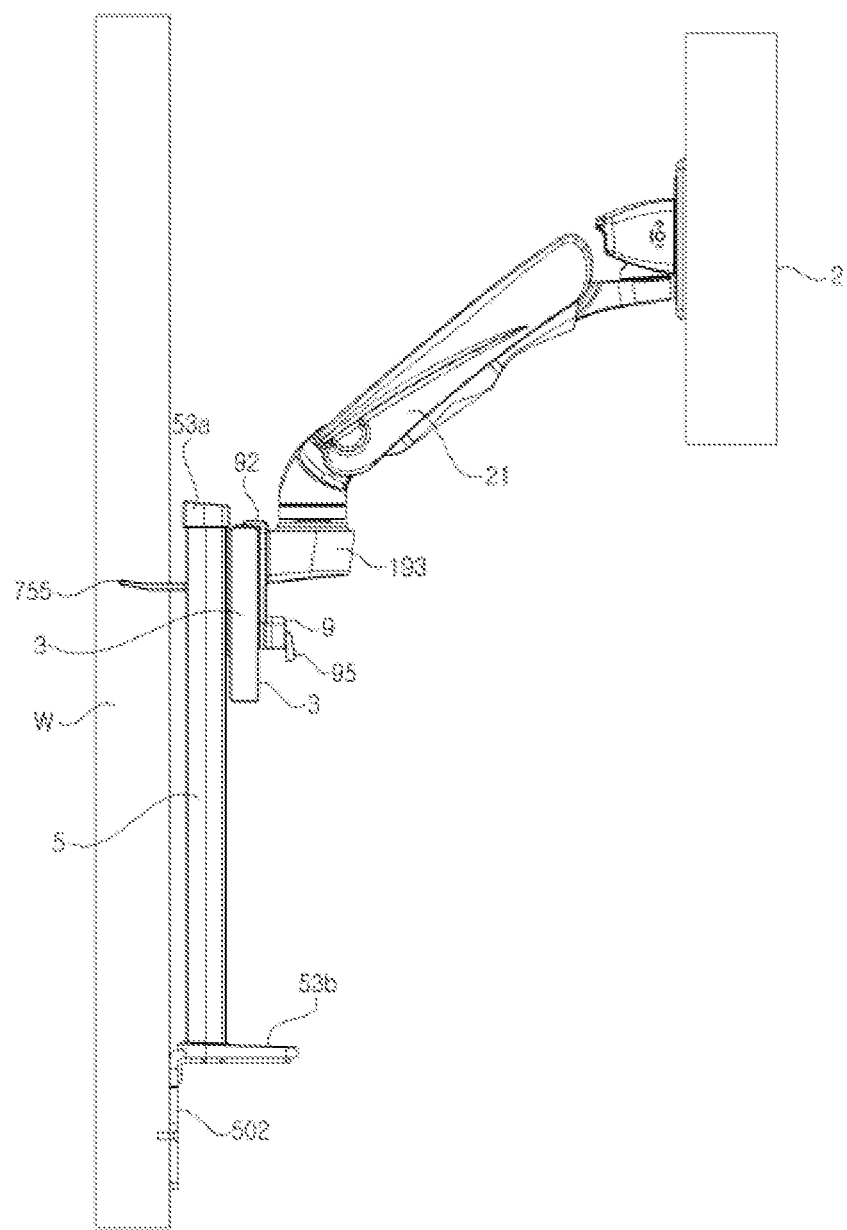
FIGS. 18 and 19 are side views showing another embodiment of a hanger device using a hanger panel according to the present invention.
Figure 19:
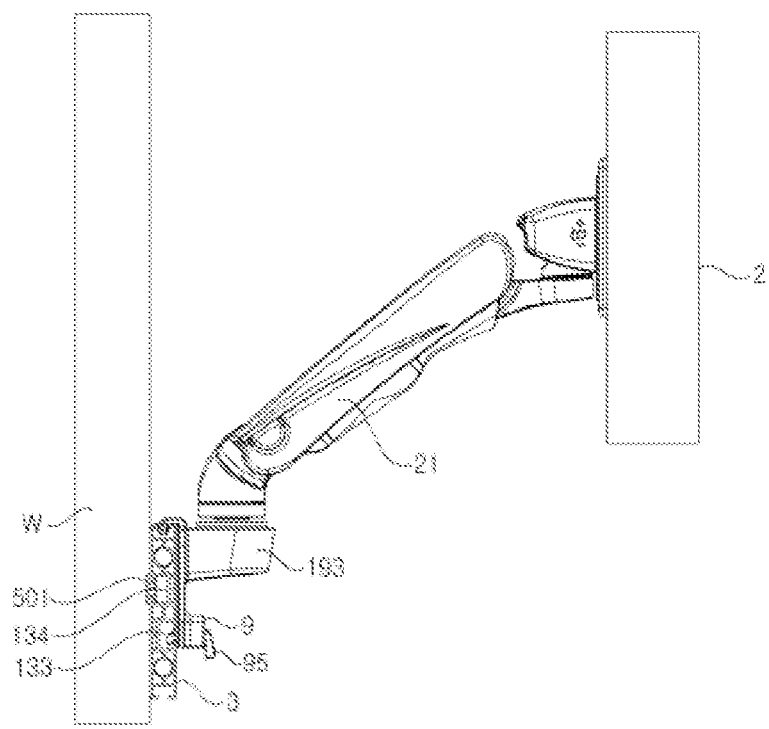
Figure 20:
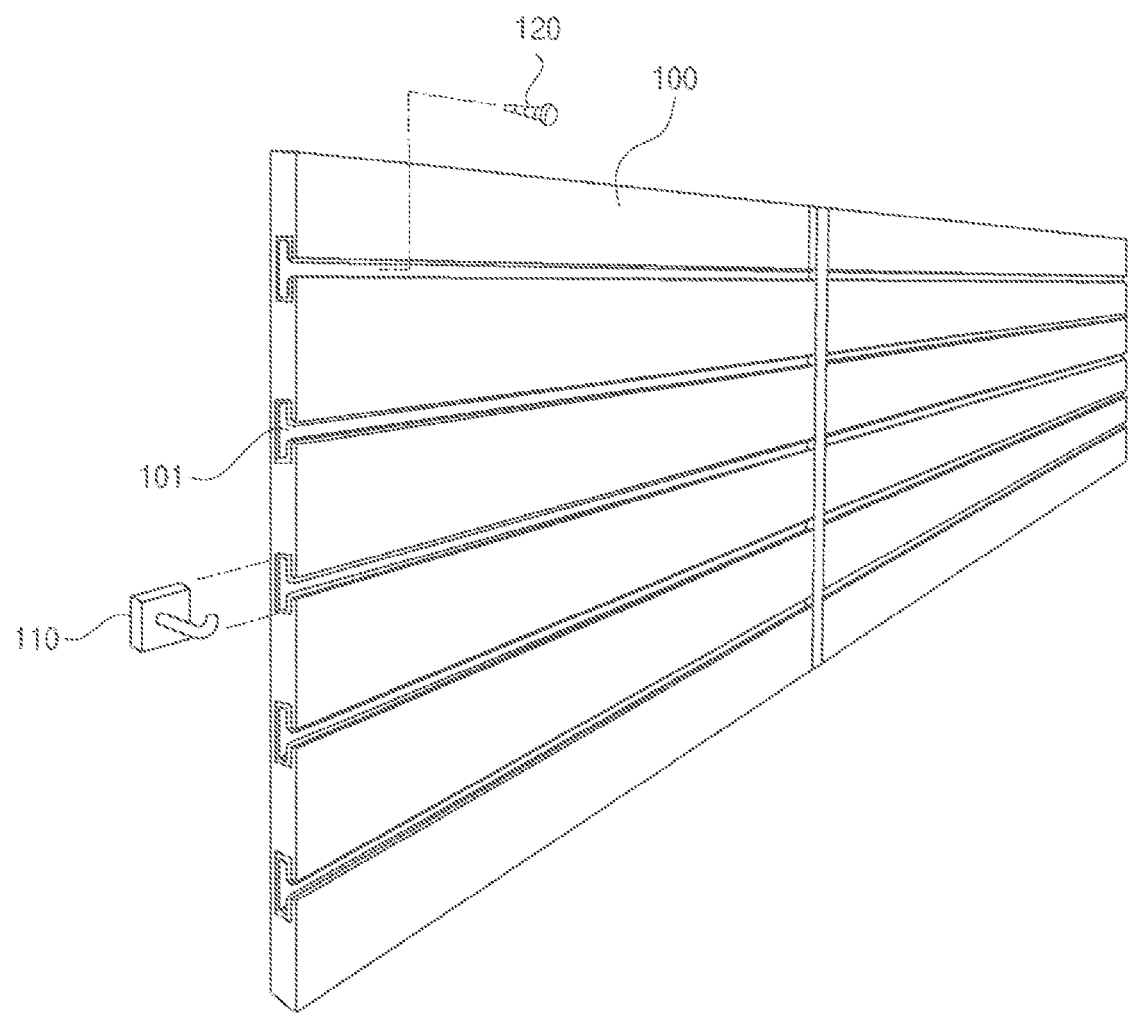
FIGS. 20 and 21 are perspective views respectively showing a hanger panel and a hanger device according to the prior art.
Figure 21:
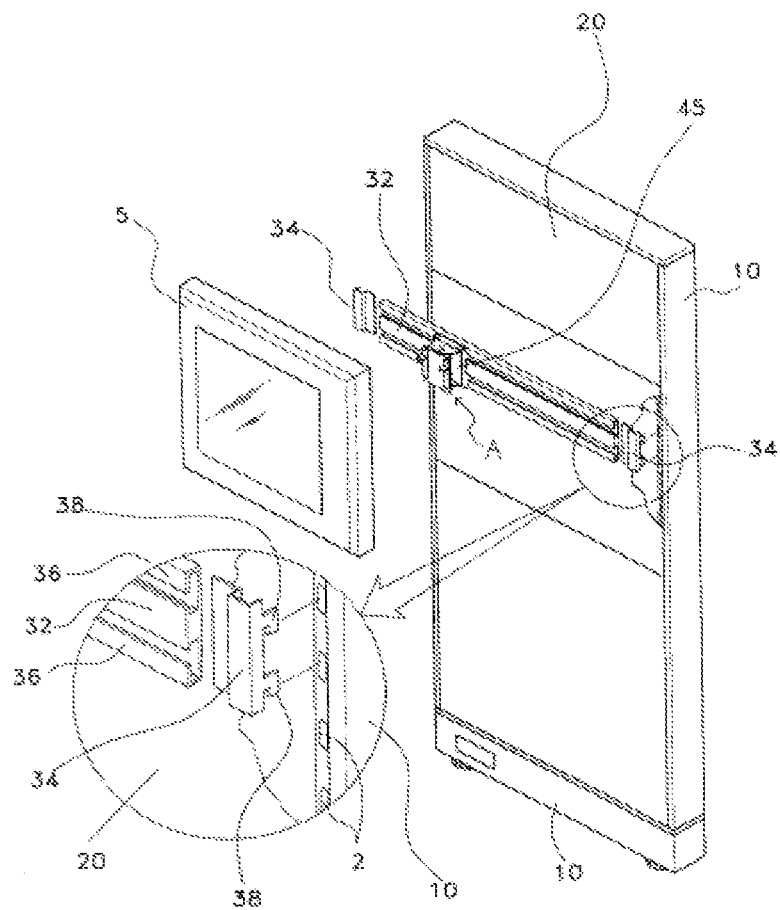

FIGS. 18 and 19 show another embodiment with regard to installation of the hanger device 1 according to the present invention. Specifically, as illustrated in FIG. 18, the hanger device 1 according to the present invention may be mounted to a wall W using an L-shaped bracket 502. In addition, as illustrated in FIG. 19, the hanger panel 3 according to the present invention may be directly mounted to the wall W using a fastening pin 501 without using the stand 5. In this case, the fastening pin 501 has one end fitted into the hanging groove 134 formed in the rear surface of the hanger panel 3 and the other end mounted to the wall W.

As described above, through use of the hanger bracket and the fixing bracket 193 having various shapes, the hanger device 1 according to the present invention may support a variety of articles, such as a cup holder, a pencil holder, a memo pad storage basket, a flowerpot basket, a Light Emitting Diode (LED) stand, a picture frame, etc, which are hung thereon. In addition, in the case in which a plurality of hanger panels 3 according to the present invention is longitudinally connected to one another or is vertically arranged one above another, the hanger device 1 constructed by the plurality of hanger panels 3 may serve as a decorative wall or partition. The hanger panel 3 of the present invention may be installed to a wall or ceiling in an exhibition place or store to achieve aesthetically pleasing display of various goods.

As is apparent from the above description, a hanger panel according to the present invention may be simply attached to a wall or be erected on desk or a table, and may serve to allow a variety of articles, such as a tablet PC, a smart phone, a cup holder, a pencil holder, etc., to be hung on or caught by the hanger panel.

Further, according to the present invention, the hanger panel is formed of a light and highly durable material capable of providing a clean outer appearance, and has the same shape in all directions and thus is usable in any direction. As necessary, a plurality of hanger panels may be longitudinally connected to one another, or may be vertically arranged one above another.

In addition, in a hanger device using the hanger panel according to the present invention, the hanger panel may be vertically moved in a state in which the hanger device is vertically installed on a table, a desk, a wall, or the like, and the hanger panel may ensure easy attachment or detachment of articles.

According to the present invention, through provision of triple safety mechanisms, it is possible to prevent the hanger panel from being unintentionally separated from a desk or a wall, and to prevent sudden fall or breakage of articles attached to the hanger panel.

Further, according to the present invention, a variety of office supplies, more particularly, a monitor may be hung on or caught by the hanger panel in the case in which the hanger panel is erected on a desk, which may result in a wider space over the desk, and consequently enhanced space utilization.

Furthermore, the hanger device using the hanger panel according to the present invention may allow a variety of articles to be installed thereto regardless of sizes thereof, and may allow anyone to easily assemble and use the hanger device. In particular, in the case in which a monitor is attached to the hanger device, it is possible to ensure vertical movement of the monitor and free adjustment in a distance between a user and the monitor, which may result in remarkable improvement in the office environment.

In addition, according to the present invention, the hanger panel may be installed to a wall so as to achieve decorative effects, or may be installed on a desk so as to serve as a partition. In addition, by allowing a variety of wires including, e.g., an electric wire and a telephone wire to be fixed to the hanger panel, cleaning up on or around a desk is possible.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hanger device adapted to store objects at vertically and horizontally adjustable locations along the hanger device, the hanger device comprising:
    a hanger panel including a plurality of hanging grooves, wherein an object is configured to be attached to the hanger panel, wherein said object is capable of moving horizontally along the hanger panel;
    a stand configured to support the hanger panel and including two pillar members spaced apart from each other by a predetermined distance and two guide blades, each guide blade being integrally connected to each of the pillar members and disposed to face one anther; and
    a slide fixing member coupled to the stand so as to be vertically slidable along the stand, the slide fixing member being configured to fix the hanger panel to the stand at various vertical locations along the stand,
    wherein the slide fixing member includes:
    guide grooves disposed in left and right surfaces thereof, into which the guide blades are inserted; and
    an unlocking member configured to pull a fixing plate, which is inserted into one of the hanging grooves of the hanger panel, toward the stand to wedge the hanger panel between the fixing plate and the stand, so as to fix the hanger panel to the stand.

2. The hanger device according to claim 1, wherein the slide fixing member further includes an elastic friction member configured to increase friction between the slide fixing member and the guide blades, so as to fix the slide fixing member to the stand.

3. The hanger device according to claim 2, wherein the slide fixing member further includes a ball plunger configured to be inserted into one of fixing recesses arranged in a line along the pillar member, so as to fix the slide fixing member to the stand.

4. The hanger device according to claim 1, wherein the unlocking member includes:
    the fixing plate configured to be inserted into the hanging groove; and
    a cam pivot member configured to pull the fixing plate toward the slide fixing member so as to fix the hanger panel to the stand.

5. The hanger device according to claim 4, wherein the cam pivot member includes:
    a cam washer configured to come into contact with the guide blades;
    a fixing rod connected to the fixing plate and configured to penetrate the cam washer;
    a cam rotatably coupled to one end of the fixing rod, the cam having a cam surface to apply pressure to the cam washer; and
    a lever protruding from one side of the cam.

6. The hanger device according to claim 5, wherein a compression spring is installed on an outer circumferential surface of the fixing rod so as to be located between the cam washer and the fixing plate, and serves to continuously push the fixing plate, which is movable on the fixing rod, toward a tip end of the fixing rod.

7. The hanger device according to claim 2, wherein the elastic friction member includes:
    a friction member configured to come into contact with the guide blades; and
    a leaf spring configured to continuously apply pressure to the friction member.

8. The hanger device according to claim 3, wherein the ball plunger includes:
    a ball configured to be inserted into the fixing recess;
    a fixing pin in which the ball is fixedly seated;
    a spring configured to apply pressure to the fixing pin; and
    a cylindrical case in which the fixing pin and the spring are accommodated.

9. The hanger device according to claim 1, wherein the hanger panel includes:
    a rectangular panel body of a hollow type, the interior of which is empty;
    upper and lower hanging grooves longitudinally formed respectively in upper and lower surfaces of the panel body; and
    one or more front hanging grooves and rear hanging grooves longitudinally formed in front and rear surfaces of the panel body.

10. The hanger device according to claim 9, wherein the front and rear hanging grooves are vertically alternately arranged, and
    wherein each of the upper and lower hanging grooves and the front and rear hanging grooves includes:
    a grooved portion having a predetermined depth; and
    a neck portion provided with two extensions protruding toward each other from an inner surface of the grooved portion.

11. The hanger device according to claim 10, wherein a hanger bracket is installed to the hanger panel such that a variety of articles are hang on or supported by the hanger bracket.

12. The hanger device according to claim 11, wherein the hanger bracket includes:
    a fixing plate having a predetermined size, the fixing plate being configured to come into close contact with the hanger panel;
    a U-shaped fixing portion integrally formed at an upper end of the fixing plate, the U-shaped fixing portion being inserted into an upper one of the two hanging grooves of the hanger panel vertically spaced apart from each other by a predetermined distance;

a hook configured to be inserted into a lower one of the two hanging grooves formed in the hanger panel; and a hook pivot member configured to vertically pivot the hook so as to fix or release the hanger bracket to or from the hanger panel.

13. The hanger device according to claim 12, wherein the hook pivot member includes:

a hook bar extending from one end of the hook;

a rotating shaft configured to vertically pivotally support the hook bar;

an elastic member configured to continuously push the hook bar downward from the rear side of the rotating shaft; and a handle installed to the end of the hook bar.

* * * * *